United States Patent Office 2,966,525
Patented Dec. 27, 1960

2,966,525
PREPARATION OF ALLYL CHLORIDE

Donald E. Steen, Houston, Tex., assignor to Monsanto Chemical Company, St. Louis, Mo., a corporation of Delaware No Drawing. Filed May 19, 1959, Ser. No. 814,167

3 Claims. (Cl. 260—654)

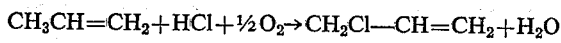

The present invention relates to the preparation of allyl chloride. More particularly, it relates to the preparation of allyl chloride by the reaction of oxygen and hydrogen chloride with propylene.

It is known that substitutive halogenation of olefins can be effected by means of the reaction of olefins with a hydrogen halide and oxygen in the presence of an oxidation catalyst. The use of an oxidation catalyst is taught to be essential in order to obtain good yields of the unsaturated halogenated compounds. The preferred catalysts for the reaction are the oxides or compounds of copper, iron and bismuth, and, in general, the best results are obtained by the use of a copper catalyst which may be in the metallic state or as copper oxide or a copper salt. Many other materials, however, have been found to be effective, as for example, zinc oxide, barium oxide, alumina, various rare earth oxides, magnesium oxide, manganese oxide, silver oxide, titanium oxide, lead oxide, bismuth oxide, cobalt oxide, nickel oxide, magnesium sulfate, and molybdenum dioxide. Preferably, the catalysts are deposited on refractory supports such as pumice, silica gel, alumina gel, firebrick, porcelain or the like. Using these catalysts, it is possible, for example, to react ethylene with hydrogen chloride and oxygen or air at a temperature in the range from 250° C. to 600° C. to produce a mixture of various chlorinated ethylene such as vinyl chloride, dichloroethylene, trichloroethylene, and perchloroethylene. Likewise, when propylene is reacted with oxygen and hydrogen chloride under similar conditions, chloropropylene such as allyl chloride and methyl vinyl chloride together with polychloropropylenes and small proportions of decomposition products such as methyl acetylene and allene are produced. In all cases, the products of the prior art processes have been mixtures of chlorinated compounds and the recovery of a particular chlorinated compound therefrom has entailed added expensive and sometimes difficult purification operations.

It has thus not been possible heretofore to produce allyl chloride from propylene by the oxidative chlorination technique of the prior art in good conversions and high yields. Now, however, it has been discovered that propylene may be converted to allyl chloride of high purity, i.e., with the substantial exclusion of other chlorinated products, and in good yields by oxidative chlorination if certain catalysts are employed. According to the invention, propylene is reacted with hydrogen chloride and oxygen (or air) in contact with lithium chloride supported upon pumice. This catalyst is highly selective in converting propylene to allyl chloride with yields of 90% or better being obtained when it is employed.

The reaction may be carried out by mixing the propylene with hydrogen chloride and air or oxygen and passing the mixture in contact with the catalyst in a heated reaction chamber; or if desired, the mixture may be introduced into the reaction zone in three separate streams; or the air or oxygen may be introduced into a mixture of propylene and hydrogen chloride. Precaution should be taken to avoid allowing the propylene and oxygen to reach reaction temperature in the absence of the hydrogen chloride.

In the preferred embodiment of the invention, the catalyst is employed in the fluidized or pseudo liquid state. It is maintained in a fluid or suspended state within the reaction zone by the gaseous reactants themselves or, optionally, by the use of an additional inert gas introduced from an outside source. The use of a fixed-bed operation, however, is not outside the scope of the invention.

The relative proportions of the reactants used may vary considerably. Preferred proportions are those corresponding to the stoichiometric quantities required for the reaction as indicated by the following equation.

$$CH_3CH=CH_2+HCl+\tfrac{1}{2}O_2 \rightarrow CH_2Cl-CH=CH_2+H_2O$$

However, excesses of any or all of the reactants may be employed if desired without significantly affecting the reaction. Contact time is not critical and may vary from about ½ sec. to about 12 sec.

Reaction temperature is a critical factor and the temperature must be maintained above about 400° C. to effect the reaction. Preferably the temperature is kept within the range from about 400° C. to about 520° C. Temperatures above 520° C. and up to 600° C. may be employed, however.

The catalyst of the invention is readily prepared by saturating pumice with a solution, aqueous or otherwise, of lithium chloride, filtering and drying the impregnated pumice. Further drying is effected by means of a flow of nitrogen (or other inert gas), hydrogen chloride and/or air through the mass while it is being heated to reaction temperature after it has been charged to the reactor. A more active catalyst is that prepared from a methanolic solution of lithium chloride. Better catalytic activity has also been observed for a catalyst prepared and dried under vacuum. Some carbonization of the catalyst occurs during the reaction but the catalyst can be readily reactivated or regenerated by heating with air at a temperature of about 500° C.

The following example is presented to illustrate the invention but is not to be construed as limiting it in any manner.

Example

A tubular glass reactor about 4 ft. long and 40 mm. in diameter wrapped with Nichrome wire for heating and covered with asbestos insulation was employed as the reactor. A thermowell containing a thermocouple for measuring temperatures was centrally positioned in the reactor extending throughout its length. A catalyst consisting essentially of lithium chloride supported on pumice was charged to the reactor and fluidized by passing nitrogen up through it while the reactor was brought up to reaction temperature. Thereafter, propylene, hydrogen chloride and air, in the approximate molecular ratio of 1:1:2.5 were passed through rotameters into a mixer and preheater and then into the reactor where they were contacted with the fluid catalyst maintained at a temperature within the range from about 500° C. to 520° C. As the reactants were introduced, the flow of nitrogen to the reactor was proportionately reduced so that the velocity of the entering gaseous reactants helped to maintain the catalyst in its fluidized state.

Effluent gases from the top of the reactor were passed through a separator filled with glass wool for removal of any entrained catalyst particles and thence into a series of Dry Ice traps and finally through a caustic scrubber for removal of unreacted HCl. Off-gas from the scrubber was vented through a wet-test meter.

The liquid product from the Dry Ice trap was collected and subjected to flash distillation for removal of unreacted materials. The remaining crude product was analyzed by gas chromatographic means and found to consist essentially of allyl chloride with only very minor quantities of any other chlorinated products present. Approximately 13% of the HCl fed was converted to allyl chloride. This selectivity of the lithium chloride catalyst is striking and unexpected in view of the fact that with the catalysts known to the art, the crude chlorinated product contains in addition to the desired allyl chloride, substantial amounts of other compounds derived from chlorinating propylene such as the dichloropropanes and polychloropropylenes, the sum total of these other compounds sometimes predominating in amount over the allyl chloride obtained.

What is claimed is:

1. A process for the preparation of allyl chloride which comprises reacting propylene with hydrogen chloride and oxygen in the presence of a catalyst which consists essentially of lithium chloride supported on pumice at a temperature above about 400° C.

2. A process for the preparation of allyl chloride which comprises reacting propylene with hydrogen chloride and oxygen at a temperature in the range from about 400° C. to about 600° C. in the presence of a catalyst which consists essentially of lithium chloride supported upon pumice.

3. A process for the production of allyl chloride which comprises reacting propylene with hydrogen chloride and oxygen in the molecular ratio of 1:1:0.5 at a temperature in the range from about 400° C. to about 520° C. in the presence of a catalyst which consists essentially of lithium chloride supported upon pumice.

References Cited in the file of this patent

UNITED STATES PATENTS

| | | |
|---|---|---|
| 2,094,064 | Flemming | Sept. 28, 1937 |
| 2,308,489 | Cass | Jan. 19, 1943 |